Patented Nov. 16, 1943

2,334,281

UNITED STATES PATENT OFFICE 2,334,281

PECTIN JELLY COMPOSITION

Aksel G. Olsen, Summit, and Ellis R. Fehlberg, Rutherford, N. J., assignors to General Foods Corporation, New York, N. Y., a corporation of Delaware No Drawing. Application January 14, 1941, Serial No. 374,400

8 Claims. (Cl. 99—132)

The present invention pertains to pectin jellies, and particularly to "low sugar" pectin jellies containing little or if desired no sugar as contrasted with the sugar content of 60% to 70% in pectin jellies as generally known and used heretofore. This application is a continuation in part of our prior application, Serial No. 269,790, filed April 24, 1939.

Edible jellies may conveniently be divided into two classes, namely:

(1) High sugar jellies, such as the usual fruit jellies containing 60–70% sugar and used as spreads or along with meat, etc.; they are always used sparingly in the menu because of their richness.

(2) Low sugar or sugarless jellies, such as (a) gelatin dessert jellies containing usually 15–20% sugar, (b) fruit salads composed of gelatin jellies with added fruit, (c) vegetable salads composed of gelatin jellies with added vegetables, and (d) jellied consomme containing little or no added sugar. Many other examples of edible jellies in this class could be mentioned.

Pectin, the jelly-forming ingredient naturally present in many fruits, has been used for years in the home and by manufacturers in the preparation of jams and jellies of the high sugar type. The jelly-forming properties of pectin are known to depend largely on the extent to which the methoxyl groups are removed from the pectin molecule with a corresponding increase of free acid groups, and this condition can be conveniently expressed in terms of the equivalent or combining weight of the pectin, i. e., that weight of pectin which corresponds to one free acid group as determined by titration. Pectins as used heretofore in making jams and jellies are designated as either "Rapid-set" or "Slow-set," the usual rapid-set pectins having equivalent weights of 800–1,000 and the slow-set about 550–600. One commercial pectin has an equivalent weight of only 420, which heretofore has been the lowest for any commercial pectin.

The factors involved in the formation of jellies with such pectins have been subjected to much study, and it has become generally recognized that pectin as heretofore known and used does not form a jelly except in the presence of certain minimum concentrations of acid and sugar which bring pectin jellies as heretofore known within the first class of high sugar content. Thus commercial and homemade jellies usually contain somewhat more than 60% but less than 70% sugar. However, jellies have been prepared with somewhat smaller proportions of sugar.

Norman, in his book "Biochemistry of Cellulose, Polyuronides, Lignin, etc." says "Jellies have been obtained with as little as 40% sugar, though in such cases the pectin concentration must approach 2 per cent." Noyes (1923) reported jellies produced with sugar concentrations varying from 38% to 72%, and Poore (1925) set the minimum at 37% sugar. Mehlitz (1925) stated that a sugar concentration varying between 50% and 70% was necessary for jelly formation, thus being in close agreement with Eckart and Gyalokay (1927) who reported the workable range as 50% to 75% with an optimum at 60% sugar. Lüers and Lockmüller (1927) further indicated that the minimum sugar concentration varied with the pectin concentration, their data showing a rapid rise in jelly strength as the sugar concentration increased from 45% to 60% but a much slower rise between 60% and 75% sugar. Tarr and Baker (1926) presented data indicating a maximum jelly strength at about 69% sugar and hence concluded that a saturated sugar solution was essential for the best jelly formation.

Using a regular commercial powdered pectin of normal high equivalent or combining weight, we have checked the effects of varying sugar and pectin concentrations within wide limits and have obtained results substantiating the conclusions of the above workers, namely, that approximately 40% sugar represents the lowest level at which pectin jellies are obtainable with commercially available pectin. These tests were carried out under conditions which were optimum for the formation of jellies with a minimum of sugar. Thus, it is generally recognized that the acid, sugar and pectin may be varied to some extent in inverse proportion to one another; for instance, an increase in acid permits a lowering of the sugar minimum. Likewise, calcium salts have been found to permit a reduction in concentration of each of the other ingredients for as Halliday and Bailey (1924) pointed out, "the concentration of pectin, acid, and sugar required for gelation is somewhat lowered by the presence of calcium chloride." These authors found that 0.5% $CaCl_2$ introduced along with 1.0% pectin caused a jelly to be formed with as low as 46% sugar, using the commercial pectin concentrate then on the market. U. S. Patents Nos. 1,997,615 and 1,997,616 also describe the effect of calcium additions on the jelly strength of customary pectin preparations. None of these jellies can be used for purposes such as are included in the second class mentioned above, however, for even jellies with minimum sugar concentrations of the order discussed above are too sweet to use except as spreads.

Sugarless jellies can be made with pectic acid, but because of the special methods of preparation required and their undesirable characteristics pectic acid jellies are not suitable for practical use as edible jellies. The so-called pectic acid, i. e., completely demethoxylated pectin, has a theoretical equivalent weight of 176, but actual determinations usually result in a figure between 200 and 210, probably due to impurities present. If the enzyme pectase is added to a solution of pectin containing some calcium or other alkaline earth salt, the pectin is changed to pectic acid which reacts with the calcium and forms a brittle jelly. Such jellies, however, have never been satisfactory, partially because of the difficulty in preparing them and partially because of their undesirable brittle texture. Also when alkali is added to a solution of pectin, the pectin is changed to pectic acid and a jelly can then be formed by adding acid, but due to the difficulty of adding the acid uniformly without disturbing the solution, the result is usually a lump of precipitated jelly surrounded by fluid. Moreover, while sugar is not required for pectic acid jellies, pectic acid is not soluble in water or fruit juice and is, therefore, not suitable for use as a jelly-forming ingredient. Hence pectic acid jellies have never come into practical use as food jellies.

For these reasons low sugar or sugarless jellies of the second class mentioned above have always been prepared heretofore with non-pectous jellifying agents such as gelatin, Irish moss, agar, starch, etc., although such jellies have many important disadvantages as compared with pectin jellies. For example, gelatin is by far the most common jellifying ingredient of such jellies. Unlike pectin jellies, gelatin jellies require refrigeration in order to set and to retain their set; this makes their use on farms lacking refrigerated storage very difficult, and greatly interferes with the use of such jellies during the summer season and in tropical climates due to the tendency of the jellies to soften and melt before or while being served. When served as salads or desserts in warm weather, such jellies often lose both texture and shape and are reduced to shapeless soupy masses which are unappetizing in appearance and unpalatable as well. This is particularly apt to occur in restaurants and hospitals where considerable time may elapse during which the jelly is exposed to room temperature.

One object of this invention is, therefore, to provide a pectin jelly having the desirable characteristics of the usual high sugar pectin jelly, but containing 30% or less of sugar.

Another object is to provide a low sugar or sugarless pectin jelly which can be used as a dessert jelly, jellied salad base, or the like, and which will retain its desirable texture and consistency regardless of warm temperatures and without refrigeration.

Another object is to provide a low sugar or sugarless pectin jelly useful as a dessert jelly, salad base, jellied soup, etc., which can be sealed in a can or other container with or without the admixture of fruits, vegetables and the like, held in storage without refrigeration, and removed from the conatiner ready for use and without change in its original texture, consistency or other characteristics.

We have discovered that a pectin having an equivalent or combining weight in the range of 350–250 will form a jelly in the presence of calcium or magnesium ion regardless of whether sugar is or is not present. This discovery permits the use of the advantageous characteristics of pectin jellies in the above mentioned second class of low sugar or sugarless jellies, such as dessert and salad jellies, jellied fruit and vegetable salads, jellied soups, consomme, aspic, etc. Such pectin jellies have a great advantage over the usual gelatin jellies in that they retain their jelly form when exposed to warm temperatures, rendering refrigeration unnecessary and making it possible to expose such products on the serving counter or the dinner table without losing their desirable character. Moreover this discovery makes possible the production of new and useful products which heretofore have not been commercially practicable, such as canned vegetable and fruit salad jellies and like products. With gelatin and like jellifying ingredients, solid particles such as fruits and vegetables either settle to the bottom or float to the top of the can before the jelly is cooled sufficiently to set. Even if this difficulty is avoided during manufacture by special care and attention, such jellies are apt to soften or liquefy in the container at warm temperatures with the same objectionable results. With pectin, on the other hand, conditions can be controlled to cause prompt jellification in the can or other container without such settling of solid matter, and once jelled such products retain their jelly form regardless of temperature changes and are always ready for use on removal from the container.

Pectin of the above described character may be prepared from pectin-containing raw materials in any suitable manner which provides for controlled demethoxylation so that an end product having the desired equivalent or combining weight of between 350 and 250 can be obtained. Coincident with demethoxylation, as explained above, free acid groups are formed which render the pectin progressively more reactive with metal ions, such as calcium, the increase in reactivity being concomitant with reduction in equivalent weight. The equivalent weight is conveniently determined in the following manner: A ten-gram sample of the pectin is suspended in 60% alcohol containing 5% concentrated HCl by volume and stirred for ten minutes, using sufficient solution to make a thin slurry. The slurry is then transferred to a suction funnel and the pectin washed with the acid-alcohol solution until no more color is removed and the spent liquor shows no test for metallic ion. Then the pectin is washed with 60% alcohol until the spent liquor shows no test for chlorides with silver nitrate. After one additional wash with 95% alcohol, the pectin is first air-dried and then dried in a vacuum oven for sixteen hours at 60–65° F.

After removal from the vacuum oven, the sample is cooled in a desiccator and three one-gram samples weighed out and transferred to 400 cc. beakers. Each sample is wetted by the addition of 2 cc. of alcohol, and 150 cc. of distilled water are quickly added to each with constant stirring to bring the pectin into solution, heating being resorted to if necessary. The solutions are then diluted by the addition of 150 cc. of distilled water and cooled to room temperature, after which they are titrated with standardized N/10 NaOH to a faint pink, using phenolphthalein as the indicator.

The equivalent weight of each sample is calculated as follows:

$$\frac{1000}{\text{ccs. of alkali} \times \text{normality}} = \text{Eq. wt.}$$

By way of example, one procedure suitable for producing pectin of the desired low equivalent weight is the process described in U. S. Patent No. 2,132,577, the treatment (pickling) being continued beyond the time suitable for pectin utilized in ordinary high sugar jellies. The relationship of length of pickling time to equivalent weight of pectins prepared by this process and the suitability of such pectins to form low sugar or sugarless jellies in the presence of calcium and magnesium is shown in the following table:

| Pickling time | Equivalent weight | Approximate minimum sugar concentration | Usefulness for jellying | | |
|---|---|---|---|---|---|
| | | | 60% sugar | 30% sugar | No sugar |
| Hours | Grams | Per cent | | | |
| 5 | 700 | 42 | Yes | No | No |
| 20 | 550 | 42 | Yes | No | No |
| 45 | 425 | 42 | Yes | No | No |
| 65 | 350 | 0 | No | Yes | Yes |
| 90 | 320 | 0 | No | Yes | Yes |
| 140 | 290 | 0 | No | Yes | Yes |

As indicated in this table, pectins having an equivalent weight of from 350 to 250 will, in the presence of calcium or magnesium ion, form satisfactory jellies with a sugar content ranging from about 30% down to none at all. These jellies have all of the desirable physical characteristics of fruit jellies of the high sugar type, being clear in color, firm and shape retaining yet palatable and tender, and requiring no higher concentrations of pectin than those typical of such high sugar jellies. On the other hand, pectins of the type commercially available heretofore, having an equivalent weight ranging from 420 upward, will not make satisfactory jellies with 30% or less of sugar, even though the pectin concentrations be increased beyond desirable limits.

It should be understood that although we prefer to use pectin obtained by the above mentioned pickling method, any pectin obtained by other means, if of suitable equivalent weight, will work exactly the same way, and the use of such pectins is within the scope of our invention.

Any edible calcium or magnesium salt may be used to supply the necessary alkaline earth metal ion. In the case of very soluble salts such as calcium chloride, for example, care is required to avoid lumping or curdling because the ready availability of the metal ion induces a very rapid set, and for this reason it is usually preferred to use a less readily soluble salt, such as the phosphates, sulfates, carbonates, or citrates. However, the conditions of jelly formation can be so adjusted and controlled as to eliminate the difficulty of too rapid a set and to give a satisfactory product even with calcium chloride. The rate of setting may be materially retarded by the addition of buffer salts, such as for example, sodium citrate; thus by suitable combinations of the alkaline earth metal salt, a buffer salt and an acid, the tartness, rate of set, and texture of the jelly can be regulated within wide limits.

The amount of alkaline earth metal salt to be used is determined on the basis of the amount of pectin and its equivalent weight with due regard to the jelly texture desired. The actual amount of metal ion which will react with the pectin is, of course, determined by their respective equivalent weights; thus 0.2 gram of calcium ion and 0.12 gram of magnesium ion are the equivalents of 3.2 grams of pectin of 320 equivalent weight. However, we have made desirable jellies in which the metal salt varies from less than half to more than two equivalents. With lesser amounts of metal ion the full jelly strength is not obtained; however, the texture of the jelly is softer and more gelatin-like than with higher amounts, and may, therefore, be preferred for some purposes.

By way of illustration of the invention, reference is made to the following specific examples:

EXAMPLE 1.—*Low sugar jelly*

| | Grams |
|---|---|
| Sugar | 100.0 |
| Pectin, 335 equivalent weight | 3.0 |
| $Ca_3(PO_4)_2$ | 0.4 |
| Color | 0.1 |
| Flavor | 0.35 |
| Citric acid | 3.0 |
| Sodium citrate | 3.0 |
| Water | 400.0 |

The sugar, pectin, color, flavor, sodium citrate and acid are mixed, water is added, and the whole brought just to a boil. The $Ca_3(PO_4)_2$ is then added, dispersed in 5 cc. of $H_2O$. This dispersion of the fine $Ca_3(PO_4)_2$ by the water serves to wet each particle and prevent insoluble $Ca_3(PO_4)_2$ aggregates forming in the jelly.

The jelly sets slowly after the addition of the calcium salt at the pH of 4.17 obtained by the above acid and salt concentration. A successful jelly may also be prepared with the above formula, using $Ca(H_2PO_4)_3$. The $Ca(H_2PO_4)_2$ content is increased to give the same calcium concentration, and the citric acid is reduced accordingly.

The jelly retains its set and pleasing texture at summer temperatures.

EXAMPLE 2.—*Canned fruit salad*

| | Per cent |
|---|---|
| Sugar | 10.00 |
| Pectin, 320 equivalent weight | 0.60 |
| $Ca_3(PO_4)_2$ | 0.08 |
| Citric acid | 0.13 |
| Water | 29.19 |
| Fruit | 60.00 |

The sugar, pectin, and acid are mixed and dissolved in water. The mixture is heated and when hot (180° F.) the previously prepared fruits are added in the ratio of about 60% fruit to 40% jelly syrup. After the fruit has been uniformly distributed through the syrup, the tricalcium phosphate slurry is added and distributed by agitation and the material is rapidly poured into cans where it sets in 60 to 180 seconds. It may be sealed while hot and sterilized 15 minutes in boiling water. It is air-cooled slowly and in an upright position so that the air space is at the top of the can.

Fruit salads prepared in this manner tested as follows:

| | |
|---|---|
| pH | 3.72 |
| Soluble solids | 27.80 |
| Bloom test gram | 100 |
| Syneresis | None |

The color and the flavor were good. The jelly was soft and tender, yet held its shape at room temperature and showed no signs of weeping. The texture of this salad can be modified to suit special requirements by changes in the pectin-calcium-citric acid ratios, and, if desired, color and flavor can be added to replace or enhance the fruit. This salad is suitable for packaging in sealed containers for commercial distribution. Vegetables may be used to replace the fruit to give jellied vegetable salad, in which case suitable adjustment in tartness may be made by changing the amount of acid and/or by the addition of buffer salts.

EXAMPLE 3.—*Flavored dessert jelly*

|  | Grams |
|---|---|
| Sugar | 80 |
| Pectin, 320 equivalent weight | 1.7 |
| Color and flavor to taste. | |
| Citric acid | 2.9 |
| $CaCO_3$ | 0.58 |
| Water | 472 |

A convenient method of preparation of the jelly is to dissolve all ingredients except the calcium salt in approximately ⅚ of the water; then heat to a boil, and when hot, add the calcium salt as a slurry dispersed in the remaining water. The jelly may be poured into molds and sets upon cooling. A pleasing dessert jelly is obtained which has the advantage that it sets and retains its set without resort to refrigeration as is required for gelatin jellies. Furthermore, unlike the usual pectin jellies, it contains less than 20% sugar and is, therefore, suitable as a dessert.

Fruit or vegetables may be added to the above jelly if desired, or the jelly may be poured over such fruit or vegetable materials so as to obtain any desired jellied composition.

EXAMPLE 4.—*Flavored salad jelly*

|  | Grams |
|---|---|
| Sugar | 110 |
| Color and flavor to taste. | |
| Pectin, 320 equivalent weight | 7.8 |
| Citric acid | 3.35 |
| Sodium citrate | 3.35 |
| $Ca_3(PO_4)_2$ | 0.45 |
| Water | 472 |

The dry ingredients may be all mixed together and then added to the water and the whole brought to a boil. The hot mixture may be poured over prepared fruit or vegetables in molds or in cans. It sets as it cools to form a pleasing jelly suitable for serving as either dessert or salad.

This jelly has a more gelatinous texture than that obtained with the proportions indicated in Example 2, but has the same advantage of low sugar concentration and satisfactory retention of texture under adverse weather conditions and without refrigeration.

EXAMPLE 5.—*Jellied consommé*

|  | Per cent |
|---|---|
| Pectin, 305 equivalent weight | 0.60 |
| $Ca_3(PO_4)_2$ | 0.075 |
| Bouillon (or soup) | 99.5 |

The pectin may be dissolved in part of the bouillon and the solution heated. While hot, the calcium salt dispersed in the remainder of the bouillon is quickly mixed in. When cool, a pleasing jelly is formed which can be served in any way customary for serving such jellied consommé.

In each of the foregoing examples, calcium ion is used together with the pectin to form the desired jellies. Optimum pH values for these jellies made with calcium range from about 4.0 to about 4.4 and the jellies, while tender and palatable, have melting points of the order of 140° F. or greater. When using magnesium ion, the pH of the solution should preferably be somewhat lower than in the case of jellies made with calcium ion, the optimum pH values for magnesium jellies ranging from about 2.8 to about 3.2. The melting points of magnesium jellies are also somewhat lower than those of calcium jellies, ranging from about 90° F. to about 120° F. By using part calcium ion and part magnesium ion, the melting points of the jellies can be adjusted to meet any desired conditions within a range of from about 90° F. to about 150° F.

Magnesium ion may be used instead of and in the same manner as calcium ion in jellies of the types described in the above examples, the amount of magnesium being determined as explained above and the pH of the solution being adjusted by adjusting the acid and buffer ingredients. Such magnesium jellies permit of canning equally as well as the calcium jellies and in some cases are preferable because of their somewhat lower melting points and the consequent readier release of flavor when eaten, as in the following example.

EXAMPLE 6.—*Canned wine jelly*

|  | Grams |
|---|---|
| Sugar | 80.0 |
| Pectin, 320 equivalent weight | 5.0 |
| Citric acid | 2.0 |
| $Mg_3(PO_4)_2$ | 1.2 |
| Water | 360.0 |
| Sherry wine | 120.0 |

In preparing this dessert the dry ingredients are added to the water and the whole heated to a boil. The solution is then cooled and when it reaches a temperature of about 120° F. the wine is added.

Both calcium and magnesium jellies may also be prepared in the form of dry powder preparations adapted to be mixed with water by the housewife to form jellies. These dry mixes may contain color, flavor, acid, etc., so that only the addition of water is needed to form a complete jelly similar to the gelatin dessert jellies now on the market, or the addition of flavor, color, sugar, etc., may be left to the taste and discretion of the housewife. In the following examples of such dry mixtures the proportions of the various ingredients have been so adjusted as to provide the desired jellies upon addition of one pint of water.

EXAMPLE 7.—*Dry jelly mixtures*

|  | Calcium jelly | Magnesium jelly |
|---|---|---|
|  | *Grams* | *Grams* |
| Pectin, 320 equivalent weight | 4.1 | 5.5 |
| Sugar | 80.0 | 80.0 |
| Citric acid | 4.0 | 2.95 |
| Sodium citrate | 3.5 | 0.80 |
| $Ca_3(PO_4)_2$ | 0.6 | |
| $MgSO_4$ | | 2.0 |
| Color | q. s. | q. s. |
| Flavor | q. s. | q. s. |

As indicated above, when it is desired to leave the addition of flavor, color or sugar to the housewife, the formulae given in Example 7 may be modified by omitting these ingredients. Similarly in those cases where it is desired to provide a dry product adapted to be used by the housewife in the preparation of unsweetened jellies such as tomato aspic, jellied bouillon and the like, a mixture of the pectin and alkaline earth metal salt, with or without a buffer salt, will suffice.

It will be understood that the expression sugar concentration of "less than approximately 30% by weight" as used in the appended claims includes any concentration of sugar in the entire range covered thereby from about 30% down to zero (i. e., no sugar at all). Furthermore this concentration is defined in the appended claims as a percentage of the weight of the "gel component" of the finished jelly which will include pectin, alkaline earth metal salts, sugar (if any), whatever liquid is used to make the jelly, etc., or in other words the ingredients which make up the jelly phase, exclusive of pieces or lumps of fruits or vegetables and like materials (if any) which may be mixed with the gel component in the finished jelly.

It further is to be understood that the expression "jelly composition" as used in the claims is intended to cover both dry mixtures of the type herein described as well as finished jellies.

It is to be understood that the foregoing examples are given by way of illustrating the principle of our invention and are not intended to define the scope thereof, reference being had for that purpose to the appended claims. It will be readily apparent to one skilled in the art that various modifications may be introduced in the way of different concentrations of the ingredients, different flavoring substances, etc. Furthermore the principle of the invention can be applied readily to other products than those mentioned above by way of illustration, as will also be apparent to those skilled in the art. Moreover, although there is a certain gradation of pectin properties within the range of combining weights from 350 to 250, the use of any pectin having an equivalent weight within this range is within the scope of the invention.

What is claimed is:

1. An edible jelly composition containing a soluble pectin having an equivalent weight in the range 350–250 and an edible salt of a metal of the group consisting of calcium and magnesium and having a sugar concentration of less than approximately 30% by weight of the gel component of the finished jelly, said composition being otherwise substantially free of dehydrating agents.

2. An edible dry jelly-forming mixture containing a soluble pectin having an equivalent weight in the range 350–250 and an edible salt of a metal of the group consisting of calcium and magnesium and having a sugar concentration of less than approximately 30% by weight of the gel component of the finished jelly, said mixture being otherwise substantially free of dehydrating agents and capable of forming a jelly on the addition of water alone.

3. An edidble jelly containing a soluble pectin having an equivalent weight in the range 350–250 and an edible salt of a metal of the group consisting of calcium and magnesium, said jelly having a sugar concentration of less than approximately 30% by weight of its gel component and being otherwise substantially free of dehydrating agents.

4. An edible jelly composition containing a fruit acid, a buffer salt, a soluble pectin having an equivalent weight in the range 350–250, and an edible salt of a metal of the group consisting of calcium and magnesium, said composition having a sugar concentration of less than approximately 30% by weight of the gel component of the finished jelly and being otherwise substantially free of dehydrating agents.

5. An edible jelly composition containing a soluble pectin having an equivalent weight in the range 350–250, and an edible calcium salt and having a sugar concentration of less than approximately 30% by weight of the gel component of the finished jelly, said composition being otherwise substantially free of dehydrating agents.

6. An edible jelly composition containing a soluble pectin having an equivalent weight in the range 350–250 and an edible magnesium salt and having a sugar concentration of less than approximately 30% by weight of the gel component of the finished jelly, said composition being otherwise substantially free of dehydrating agents.

7. An edible jelly composition containing a soluble pectin having an equivalent weight in the range 350–250 and calcium phosphate and having a sugar concentration of less than approximately 30% by weight of the gel component of the finished jelly, said composition being otherwise substantially free of dehydrating agents.

8. An edible jelly composition containing a soluble pectin having an equivalent weight in the range 350–250 and magnesium sulfate and having a sugar concentration of less than approximately 30% by weight of the gel component of the finished jelly, said composition being otherwise substantially free of dehydrating agents.

AKSEL G. OLSEN.
ELLIS R. FEHLBERG.